(12) United States Patent
Mishima

(10) Patent No.: US 11,245,316 B2
(45) Date of Patent: Feb. 8, 2022

(54) STATOR AND ELECTRIC MOTOR

(71) Applicant: FANUC CORPORATION, Yamanashi (JP)

(72) Inventor: Yamato Mishima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 222 days.

(21) Appl. No.: 16/185,259

(22) Filed: Nov. 9, 2018

(65) Prior Publication Data

US 2019/0181735 A1 Jun. 13, 2019

(30) Foreign Application Priority Data

Dec. 12, 2017 (JP) .............................. JP2017-237548

(51) Int. Cl.
| | |
|---|---|
| *H02K 15/12* | (2006.01) |
| *H02K 3/34* | (2006.01) |
| *H02K 3/38* | (2006.01) |
| *H02K 17/16* | (2006.01) |
| *H02K 15/10* | (2006.01) |
| *H02K 15/02* | (2006.01) |

(52) U.S. Cl.
CPC ............... *H02K 15/12* (2013.01); *H02K 3/34* (2013.01); *H02K 3/38* (2013.01); *H02K 15/02* (2013.01); *H02K 15/105* (2013.01); *H02K 17/16* (2013.01); *H02K 2213/03* (2013.01)

(58) Field of Classification Search
CPC ............ H02K 15/12; H02K 3/34; H02K 3/38; H02K 15/02; H02K 15/105; H02K 17/16; H02K 2213/03

USPC .......................................................... 310/45
See application file for complete search history.

(56) References Cited

U.S. PATENT DOCUMENTS

| | | | |
|---|---|---|---|
| 5,759,589 A | 6/1998 | George, Jr. | |
| 6,486,586 B2 * | 11/2002 | Higashino | ................ H02K 3/38 310/260 |
| 7,284,312 B2 | 10/2007 | Oohashi et al. | |

(Continued)

FOREIGN PATENT DOCUMENTS

| | | |
|---|---|---|
| CN | 1485967 A | 3/2004 |
| CN | 203813623 U | 9/2014 |

(Continued)

OTHER PUBLICATIONS

Office Action issued in JP 2017-237548; mailed by the Japanese Patent Office dated Mar. 24, 2020.

(Continued)

*Primary Examiner* — Jianchun Qin
(74) *Attorney, Agent, or Firm* — Studebaker & Brackett PC

(57) ABSTRACT

A stator core, a coil, and a receiving member are included. The coil is attached to the stator core and secured by an impregnant and includes a coil end extending from an end face of the stator core in an axial direction outward in the axial direction. The receiving member having an annular shape is fixed to the end face of the stator core so as to be disposed on a farther outer side than the coil end in a radial direction of the stator core. The receiving member has an outer diameter wa smaller than an outer diameter of the stator core and has a height ha along the axial direction smaller than a height of the coil end.

10 Claims, 4 Drawing Sheets

(56) References Cited

U.S. PATENT DOCUMENTS

| | | | |
|---|---|---|---|
| 7,498,713 B2 * | 3/2009 | Higashino | H02K 3/38 |
| | | | 310/260 |
| 9,118,234 B2 | 8/2015 | Tsukamoto et al. | |
| 2002/0067091 A1 | 6/2002 | Kliman et al. | |

FOREIGN PATENT DOCUMENTS

| | | |
|---|---|---|
| DE | 4334959 A1 | 4/1994 |
| DE | 10 2006 006 798 A1 | 3/2007 |
| GN | 106329857 A | 1/2017 |
| JP | H02-276435 A | 11/1990 |
| JP | H06-070516 A | 3/1994 |
| JP | H07-031108 A | 1/1995 |
| JP | H09-066258 A | 3/1997 |
| JP | 2006-006054 A | 1/2006 |
| JP | 2006-141180 A | 6/2006 |
| JP | 2007-060824 A | 3/2007 |
| JP | 4109223 B2 | 4/2008 |
| JP | 2008-109733 A | 5/2008 |

OTHER PUBLICATIONS

Office Action issued in JP 2017-237548; mailed by the Japanese Patent Office dated Jan. 14, 2020.

An Office Action mailed by the German Patent Office dated May 28, 2020, which corresponds to German Patent Application No. 10 2018 008 891.0 and is related to U.S. Appl. No. 16/185,259; partial English translation.

An Office Action mailed by the Japanese Patent Office dated Sep. 3, 2019, which corresponds to Japanese Patent Application No. 2017-237548 and is related to U.S. Appl. No. 16/185,259.

An Office Action mailed by China National Intellectual Property Administration dated Jul. 14, 2020, which corresponds to Chinese Patent Application No. 201811481914.9 and is related to U.S. Appl. No. 16/185,259 with English language translation.

* cited by examiner

STATOR AND ELECTRIC MOTOR

This application is based on and claims the benefit of priority from Japanese Patent Application No. 2017-237548, filed on 12 Dec. 2017, the content of which is incorporated herein by reference.

BACKGROUND OF THE INVENTION

Field of the Invention

The present invention relates to a stator and an electric motor.

Related Art

A conventional technique of securing a coil by dripping an impregnant on the coil fixed to a stator core of a stator is known. For example, in the stator disclosed in Patent Document 1, an impregnant is dripped onto a coil before a housing is attached to a stator core. In the stator disclosed in Patent Document 2, an impregnant is dripped onto a coil after a housing is attached to a stator core.

Patent Document 1: Japanese Unexamined Patent Application, Publication No. H09-066258
Patent Document 2: Japanese Patent No. 4109223

SUMMARY OF THE INVENTION

However, in the stator disclosed in Patent Document 1, the impregnant adhering to an end face of the stator core is likely to exert adverse effects on assembly accuracy of the housing. In the stator disclosed in Patent Document 2, there is a possibility that the impregnant has not been dripped onto the outer circumferential side of the coil end covered by the housing.

The purpose of the present invention is to provide an electric motor and a stator including a coil secured by an impregnant each in which the deterioration in quality caused by the impregnant is suppressed.

(1) The present invention relates to a stator (for example, a stator 1, a stator 1A, a stator 1B to be described below) including a stator core (for example, a stator core 10 to be described below), a coil (for example, a coil 11 to be described below), and a receiving member (for example, a receiving member 12, a receiving member 12A, a receiving member 12B to be described below). The coil is attached to the stator core and secured by an impregnant (for example, an impregnant 13 to be described below). The coil includes a coil end (for example, a coil end 11a to be described below) extending from an end face (for example, an end face 10a to be described below) of the stator core in an axial direction (for example, an axial direction D1 to be described below) outward in the axial direction. The receiving member is fixed to the end face of the stator core so as to be disposed on a farther outer side than the coil end in a radial direction (for example, a radial direction D2 to be described below) of the stator core. The receiving member has an outer diameter (for example, an outer diameter wa, an outer diameter wb, an outer diameter wc to be described below) smaller than an outer diameter (for example, an outer diameter W to be described below) of the stator core, and also has a height (for example, a height ha, a height hb, a height hc to be described below) along the axial direction smaller than a height (for example, a height H to be described below) of the coil end.

(2) The present invention relates to an electric motor including the stator according to (1) and a rotor (for example, a rotor 20 to be described below) disposed inside the stator.

The present invention enables the provision of an electric motor and a stator including a coil secured by an impregnant each in which the deterioration in quality caused by the impregnant is suppressed.

DETAILED DESCRIPTION OF THE INVENTION

Figure 1:
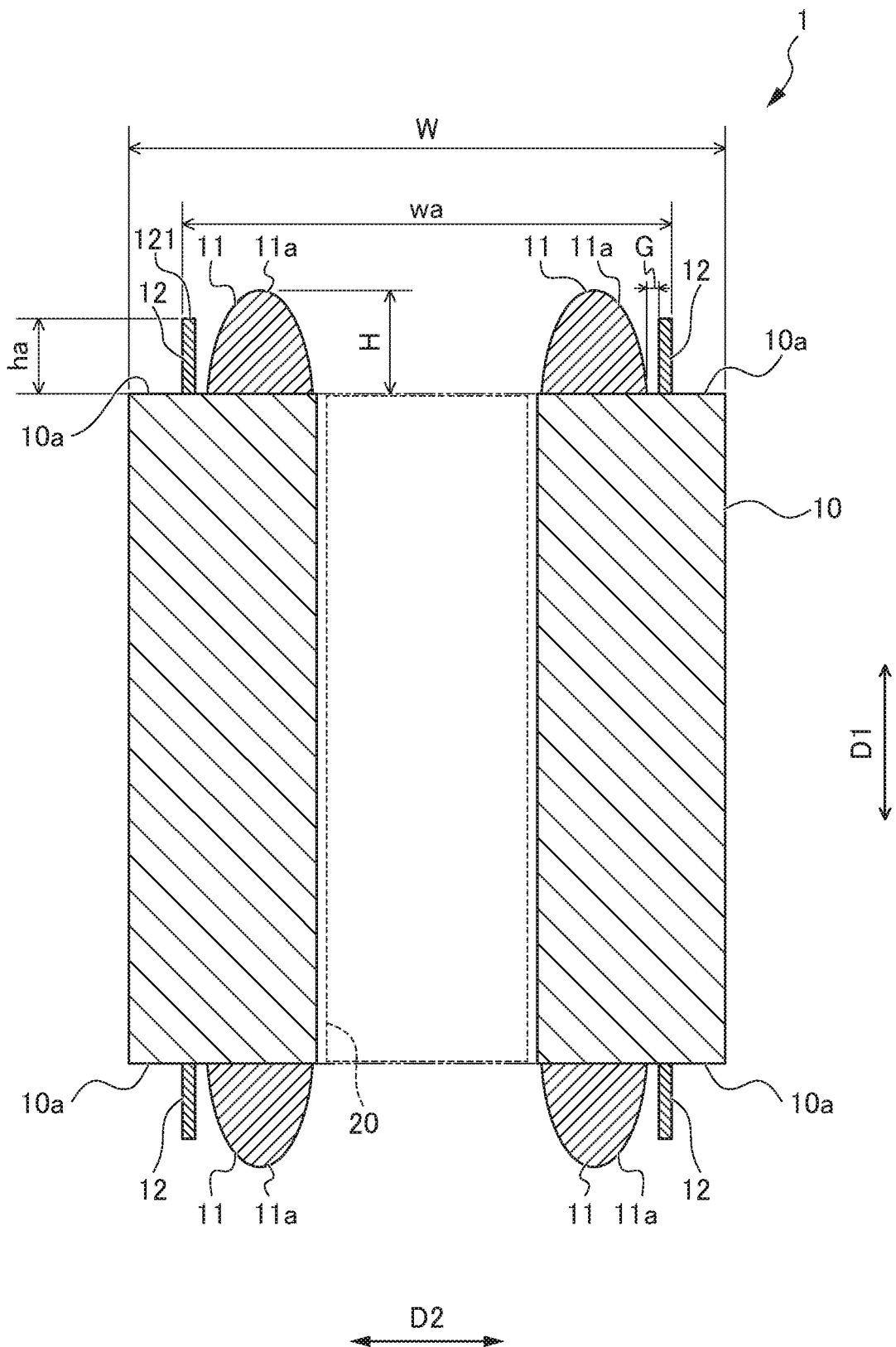
FIG. 1 is a schematic end view of a stator according to a first embodiment of the present invention.

A stator and an electric motor according to an embodiment of the present invention will be described below with reference to the drawings. It is noted that in a second embodiment and the subsequent embodiments, the same reference numerals and symbols are assigned to the configurations common to those of a first embodiment, reference numerals and symbols in the same regularity are assigned to the corresponding configurations, and the description thereof will be omitted appropriately. In the second embodiment and the subsequent embodiments, the description of the functions and effects common to those of the first embodiment will be omitted appropriately.

First Embodiment

Figure 2:
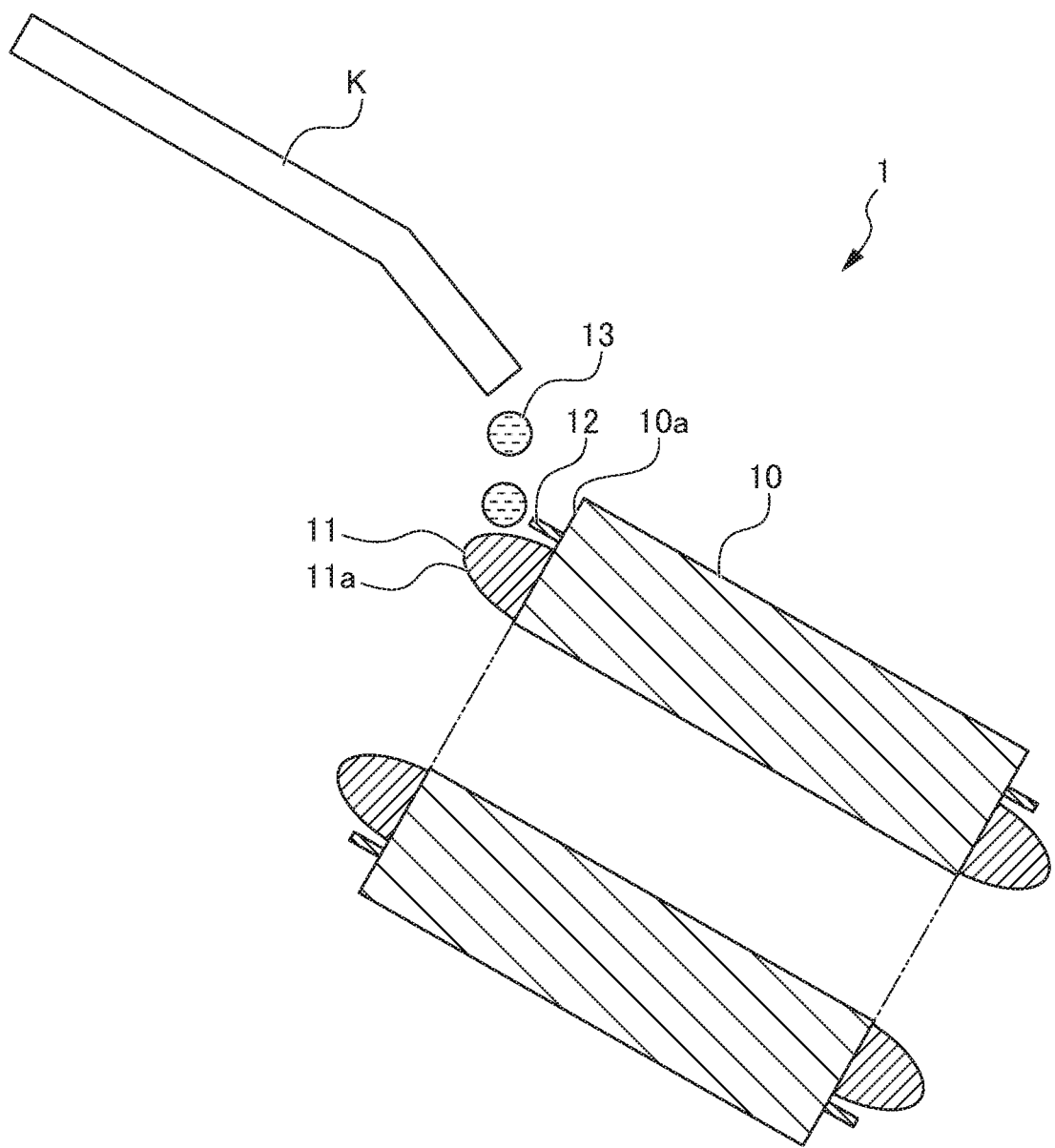
FIG. 2 is a schematic end view of the stator under the state in which an impregnant is dripped during manufacturing.

Firstly, a stator 1 and an electric motor according to the first embodiment are described with reference to FIG. 1 and FIG. 2. FIG. 1 is a schematic end view of the stator 1 according to the first embodiment of the present invention. FIG. 2 is a schematic end view of the stator 1 under the state in which an impregnant is dripped during manufacturing.

The electric motor is configured with the stator 1 of the present embodiment shown in FIG. 1 and FIG. 2 and a rotor 20 (schematically illustrated by a broken line) disposed inside the stator 1. The electric motor configured with the stator 1 of the present embodiment is a squirrel-cage induction motor. Specifically, the stator 1 includes a stator core 10, a coil 11, a receiving member 12, and an impregnant 13 (refer to FIG. 2).

The stator core 10 is configured by stacking electromagnetic steel plates in an axial direction D1. In each of the drawings, the outer diameter of the stator core 10 is denoted by a reference symbol W. In FIG. 1 corresponding to an end view, out of the lines expressing an end face 10a of the stator core 10, a line originally not illustrated in an end view is illustrated by a two-dot chain line.

The coil 11 is attached to the stator core 10 and is to be secured by the impregnant 13 (refer to FIG. 2). A coil end 11a of the coil 11 extends outward in the axial direction D1 from the end face 10a of the stator core 10 in the axial direction D1. In the drawing, the height of the coil end 11a in the axial direction D1 is denoted by a reference symbol H.

The receiving member 12 is fixed to the end face 10a of the stator core 10 with an adhesive, a screw, or the like. The receiving member 12 is an annular insulating member (for example, a member made of resin) disposed on the farther outer side than the coil end 11a in a radial direction D2 of the stator core 10 and has a flat plate-like cross section. The receiving member 12 has an outer diameter wa which is smaller than the outer diameter W of the stator core 10 (wa<W). The receiving member 12 also has a height ha along the axial direction D1 which is smaller than the height H of the coil end 11a (ha<H). The difference between the heights (H−ha) is, for example, 5 to 20 mm.

In the radial direction D2, a gap G between the outer circumferential surface of the base side of the coil end 11a and the inner circumferential surface of the receiving member 12 is, for example, 1 to 20 mm.

A tip edge 121 of the receiving member 12 provided outside in the axial direction D1 has a notched recess (not shown) for passing through a power line (not shown). When the impregnant 13 is dripped during manufacturing, the dripped impregnant 13 does not pass through the recess (not shown) since the power line (not shown) is passed through the recess (not shown). The impregnant 13 is dripped onto the coil 11 during manufacturing, thereby securing the coil 11.

The procedure for manufacturing the stator 1 is described below. Firstly, the coil 11 is attached to the stator core 10, and the receiving member 12 is fixed to the end face 10a of the stator core 10. Thereafter, as shown in FIG. 2, the impregnant 13 discharged from a nozzle K is dripped onto the coil 11, thereby securing the coil 11.

The stator 1 and the electric motor of the present embodiment enable the following effects to be exhibited as examples. The stator 1 of the present embodiment includes the stator core 10, the coil 11, and the receiving member 12. The coil 11 is attached to the stator core 10 and secured by the impregnant 13. The coil 11 includes the coil end 11a extending from the end face 10a of the stator core 10 in the axial direction D1 outward in the axial direction D1. The receiving member 12 having an annular shape is fixed to the end face 10a of the stator core 10 so as to be disposed on a farther outer side than the coil end 11a in the radial direction D2 of the stator core 10. The receiving member 12 has the outer diameter wa smaller than the outer diameter W of the stator core 10 and also has the height ha along the axial direction D1 smaller than the height H of the coil end 11a.

Accordingly, when the impregnant 13 is dripped onto the coil 11 during manufacturing, the receiving member 12 suppresses the impregnant 13 from adhering to the end face 10a of the stator core 10. Therefore, the impregnant 13 is less likely to adhere to the end face 10a of the stator core 10, whereby adverse effects are less likely to be exerted on the assembly accuracy of housing. Since the height ha of the receiving member 12 along the axial direction D1 is smaller than the height H of the coil end 11a, the receiving member 12 is less likely to prevent the dripping of the impregnant 13 onto the coil 11. As a result, it is possible to provide a stator 1 which includes the coil 11 secured by the impregnant 13 and in which the deterioration in quality caused by the impregnant 13 is suppressed, and an electric motor equipped with the stator 1.

Second Embodiment

Figure 3:
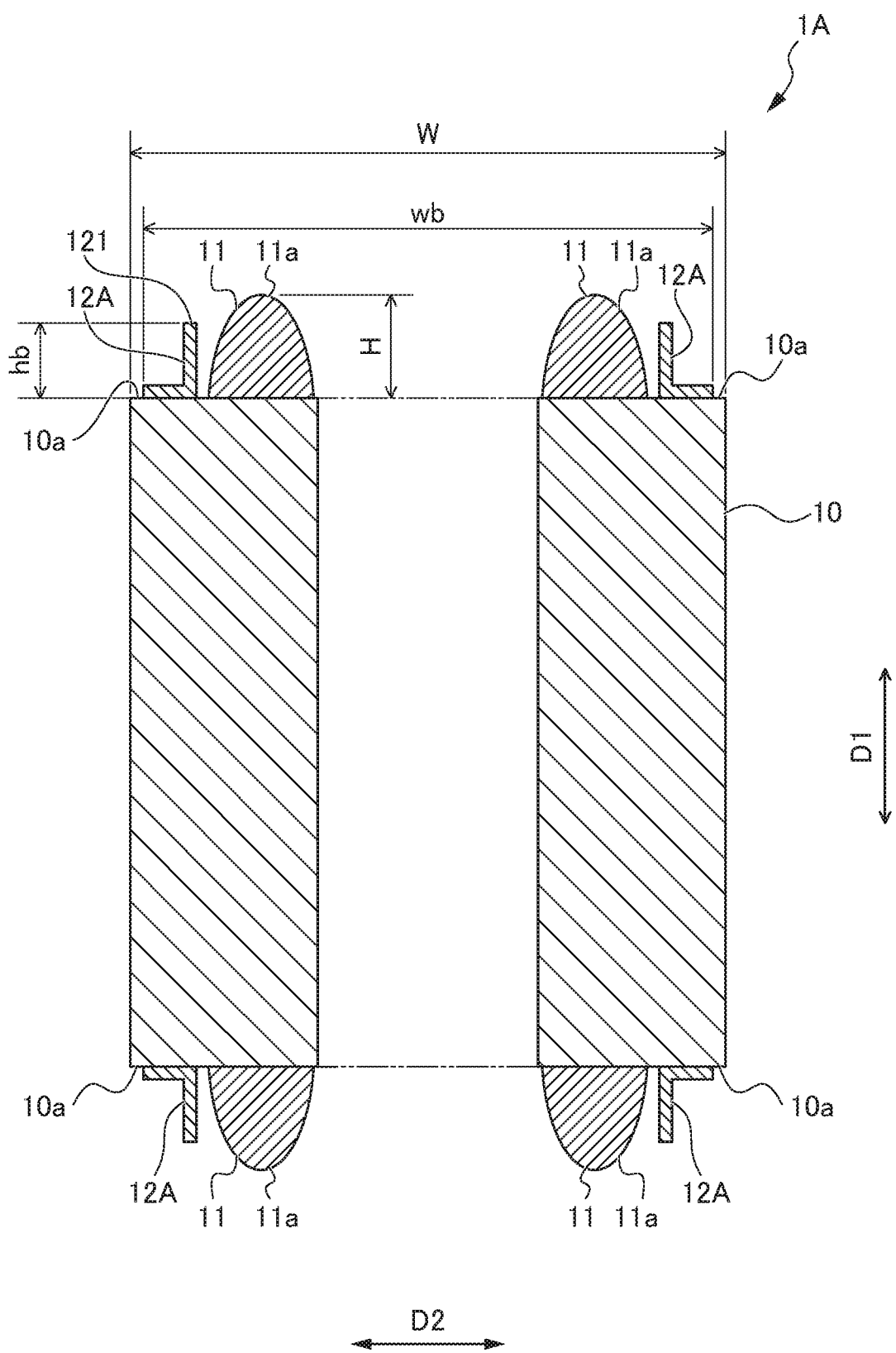
FIG. 3 is a schematic end view of a stator according to a second embodiment of the present invention.

A stator 1A according to the second embodiment is described below with reference to FIG. 3. FIG. 3 is a schematic end view of the stator 1A according to the second embodiment of the present invention. The stator 1A according to the present embodiment is different from that of the first embodiment, in that a receiving member 12A is provided instead of the receiving member 12 (refer to FIG. 1 and FIG. 2).

The receiving member 12A is different from the receiving member 12 (refer to FIG. 1 and FIG. 2) in that the receiving member 12A has an L-shaped cross section while having a basic configuration similar to the receiving member 12 (refer to FIG. 1 and FIG. 2). The laterally extending portion of the letter L faces outward in the radial direction D2. The receiving member 12A has an outer diameter wb (the outer diameter based on the tip of the laterally extending portion of the letter L) which is smaller than the outer diameter W of the stator core 10 (wb<W). The receiving member 12 also has a height hb along the axial direction D1 which is smaller than the height. H of the coil end 11a (hb<H). The tip edge 121 of the receiving member 12A in the axial direction D1 has a notched recess (not shown) for passing through a power line (not shown). When the impregnant 13 (refer to FIG. 2) is dripped onto the coil 11 during manufacturing, the dripped impregnant 13 (refer to FIG. 2) does not pass through the recess (not shown) since the power line (not shown) is passed through the recess (not shown).

Third Embodiment

Figure 4:
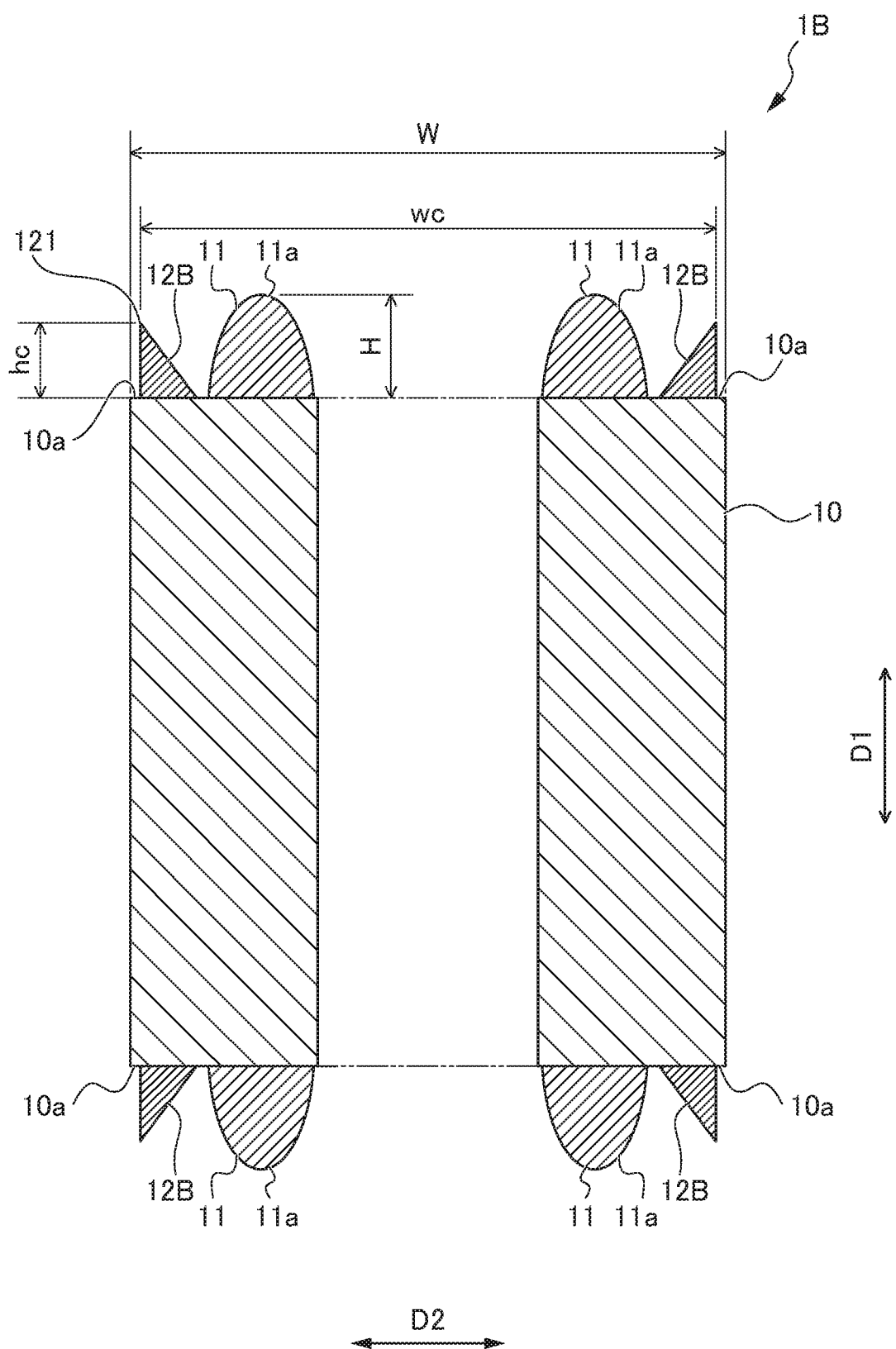
FIG. 4 is a schematic end view of a stator according to a third embodiment of the present invention.

A stator 1B according to the third embodiment is described below with reference to FIG. 4. FIG. 4 is a schematic end view of the stator 1B according to the third embodiment of the present invention. The stator 1B according to the present embodiment is different from that of the first embodiment, in that a receiving member 12B is provided instead of the receiving member 12 (refer to FIG. 1 and FIG. 2).

The receiving member 12B is different from the receiving member 12 (refer to FIG. 1 and FIG. 2) in that the receiving member 12B has a triangular cross section while having a basic configuration similar to the receiving member 12 (refer to FIG. 1 and FIG. 2). The triangle is shaped as a right triangle such that the right angle faces inward in the axial direction D1 and faces outward in the radial direction D2. The receiving member 12B has an outer diameter wc (the outer diameter based on the position of the right angle) which is smaller than the outer diameter W of the stator core 10 (wc<W). The receiving member 12B also has a height hc along the axial direction D1 which is smaller than the height H of the coil end 11a (hc<H). The tip edge 121 of the receiving member 12B in the axial direction D1 has a notched recess (not shown) for passing through a power line (not shown). When the impregnant 13 (refer to FIG. 2) is dripped during manufacturing, the dripped impregnant 13 (refer to FIG. 2) does not pass through the recess (not shown) since the power line (not shown) is passed through the recess (not shown).

The present invention is not limited to the above embodiments. Various changes and modifications are possible. For example, although the receiving members 12, 12A, 12B in the above embodiments respectively have a flat plate-like cross section, an L-shaped cross section, and a triangular cross section, the present invention is not limited thereto. Each of the receiving members 12, 12A, 12B may have any shape as long as the receiving member enables the suppression of the impregnant 13 from adhering to the end face 10a of the stator core 10 when the impregnant 13 is dripped onto the coil 11 during manufacturing. Each of the receiving members 12, 12A, 12B may also have a hole penetrating in the radial direction D2, a notched recess on the tip edge 121, or the like as long as the size of such a hole, recess, or the like makes it unlikely that dripped impregnant 13 will pass through.

EXPLANATION OF REFERENCE NUMERALS 1, 1A, 1B STATOR
10 STATOR CORE
10a END FACE
11 COIL
11a COIL END
12, 12A, 12B RECEIVING MEMBER
121 TIP EDGE
13 IMPREGNANT
20 ROTOR
D1 AXIAL DIRECTION
D2 RADIAL DIRECTION
W, wa, wb, wc OUTER DIAMETER
H, ha, hb, hc HEIGHT

What is claimed is:

1. A stator comprising:
a stator core;
a coil attached to the stator core and secured by an impregnant, the coil including a coil end extending from an end face of the stator core in an axial direction outward in the axial direction; and
a receiving member having an annular shape and being fixed to the end face of the stator core so as to be disposed on a farther outer side than the coil end in a radial direction of the stator core, the receiving member receiving an impregnant during manufacturing, the receiving member having an outer diameter smaller than an outer diameter of the stator core, the receiving member also having a height along the axial direction smaller than a height of the coil end,
the stator being configured not to make any gap that allows the impregnant to pass through between the end face of the stator core and the receiving member, and
wherein the receiving member has, in cross section, no opening that opens an inner side and an outer side of the receiving member in the radial direction, except for a recess where a power line passes.

2. An electric motor comprising:
the stator according to claim 1; and
a rotor disposed inside the stator.

3. The stator according to claim 1, wherein
the receiving member height extending from the end face of the stator core along the axial direction is smaller than the height of the coil end extending from the end face of the stator core along the axial direction.

4. The stator according to claim 1, wherein
the receiving member height extending from the end face of the stator core along the axial direction is smaller than a height of an inner circumferential surface of the coil end extending from the end face of the stator core along the axial direction.

5. The stator according to claim 1, wherein the receiving member extends continuously from the end face of the stator core such that the receiving member suppresses the impregnant from adhering to the end face of the stator core.

6. The stator according to claim 1, wherein a difference between the height of the coil end and the height of the receiving member is in a range of 5 mm to 20 mm such that the receiving member allows dripping of the impregnant onto the coil.

7. The stator according to claim 1, wherein the receiving member has an L-shaped cross section such that the impregnant is prevented from passing through a recess in a tip edge of the receiving member in the axial direction.

8. The stator according to claim 1, wherein the receiving member has a triangular cross section such that the impregnant is prevented from passing through a recess in a tip edge of the receiving member in the axial direction.

9. A stator comprising:
a stator core;
a coil attached to the stator core and secured by an impregnant, the coil including a coil end extending from an end face of the stator core in an axial direction outward in the axial direction; and
a receiving member having an annular shape and being fixed to the end face of the stator core so as to be disposed on a farther outer side than the coil end in a radial direction of the stator core, the receiving member receiving an impregnant during manufacturing, the receiving member having an outer diameter smaller than an outer diameter of the stator core, the receiving member also having a height along the axial direction smaller than a height of the coil end,
the stator being configured not to make any gap that allows the impregnant to pass through between the end face of the stator core and the receiving member, and
wherein the receiving member has an L-shaped cross section such that the impregnant is prevented from passing through a recess in a tip edge of the receiving member in the axial direction.

10. A stator comprising:
a stator core;
a coil attached to the stator core and secured by an impregnant, the coil including a coil end extending from an end face of the stator core in an axial direction outward in the axial direction; and
a receiving member having an annular shape and being fixed to the end face of the stator core so as to be disposed on a farther outer side than the coil end in a radial direction of the stator core, the receiving member receiving an impregnant during manufacturing, the receiving member having an outer diameter smaller than an outer diameter of the stator core, the receiving member also having a height along the axial direction smaller than a height of the coil end,
the stator being configured not to make any gap that allows the impregnant to pass through between the end face of the stator core and the receiving member, and
wherein the receiving member has a triangular cross section such that the impregnant is prevented from passing through a recess in a tip edge of the receiving member in the axial direction.

* * * * *